United States Patent [19]

Sagawa et al.

[11] 3,978,021
[45] Aug. 31, 1976

[54] INHIBITING OZONE DETERIORATION OF RUBBERS

[75] Inventors: Seiji Sagawa, Kawachinagano; Hideo Yamato, Saitama; Shuichi Kanagawa, Osaka, all of Japan

[73] Assignee: Sumitomo Chemical Company, Limited, Osaka, Japan

[22] Filed: Feb. 3, 1976

[21] Appl. No.: 654,875

Related U.S. Application Data

[63] Continuation-in-part of Ser. No. 437,219, Jan. 28, 1974.

[30] Foreign Application Priority Data

Jan. 31, 1973   Japan.................................. 48-13099

[52] U.S. Cl. ........................ 260/45.9 KA; 260/799

[51] Int. Cl.² .............................................. C08J 3/20
[58] Field of Search ...................... 260/45.9 KA, 799

[56] References Cited
UNITED STATES PATENTS 3,355,421   11/1967   Cook........................... 260/45.9 KA Primary Examiner—V.P. Hoke
Attorney, Agent, or Firm—Wenderoth, Lind & Ponack

[57] ABSTRACT

Rubbers are prevented from ozone deterioration without discoloring or staining by the addition of low toxic thiodipropionitrile of the formula,

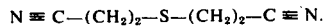

N ≡ C—(CH₂)₂—S—(CH₂)₂—C ≡ N.

1 Claim, No Drawings

INHIBITING OZONE DETERIORATION OF RUBBERS

This application is a continuation-in-part of Ser. No. 437,219 filed Jan. 28, 1974.

The present invention relates to a new method for inhibiting oxone deterioration of rubbers without problems due to discoloring, staining or toxicity, which method is very effective for protecting natural or synthetic rubbers from the ozone deterioration, i.e. generation and growth of cracks.

Natural or synthetic rubber is generally deteriorated by the action of oxygen or ozone resulting in the remarkable deterioration of its physical properties. Particularly in recent years, the deterioration caused by trace amounts of ozone in atmosphere has become a serious problem.

There have been developed various kinds of method, for the purpose of the prevention of deterioration by ozone, and it has been found that some amine compounds belonging to p-phenylenediamine derivatives act effectively as an antiozonant. These amine compounds, however, have such a property that they are discolored as early as on a rubber compounding step and particularly on a vulcanization step, or they are increasingly discolored to larger extent by the subsequent action of heat or sunlight thereby causing the discoloration of rubber itself. Alternatively, the compounds have such a property that they stain the surface of materials which have been brought into contact with the rubber. For this reason, the amine compounds can substantially be used only for the rubber products incorporated with carbon black, irrespective of their excellent inhibiting property of ozone deterioration.

Furthermore, it is well known that the amine compounds generally have a high toxicity which causes a serious problem. This promoted the development of a non-discoloring, non-staining and low-toxic antiozonant which is also available for the white rubber products, as a result of which it was found that phenol type or thiourea type compounds have an excellent inhibiting effect of ozone deterioration. In recent years, however, an antiozonant having as the major component the formula,

was found to be a non-discoloring and non-staining antiozonant that is much superior to the phenol type and thiourea type compounds above mentioned, and the product has become to be used in a large amount. This product surely has excellent non-discoloring and non-staining properties, however its inhibiting effect of ozone deterioration is not necessarily satisfactory compared with the amine compounds. The inventors have synthesized and tested a wide range of compounds for the purpose of developing a non-discoloring, non-staining and in addition low-toxic antiozonant, and found that thiodipropionitrile of the formula,

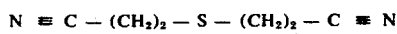

has a non-discoloring and a non-staining properties and effective protective ability for ozone deterioration of vulcanized rubber. Owing to the non-discoloring and non-staining properties, the nitrile can also be used for producing the white, pale or colored rubber products to which the conventional amine type antiozonants would be unpreferably applied. Furthermore, the nitrile can not only be prepared in an industrial scale economically and advantageously, but also the toxicity to human body is very low ($LD_{50} = 5,300$ mg/kg), and therefore they have an important significance in a practical application.

Rubbers which can be used in the present invention are natural rubber, styrenebutadiene rubber with cis-1,4-structure content of 5–20 percent, chloroprene rubber, butadiene rubber with cis-1,4-structure content of 5–20 percent, isobutylene-isoprene rubber, isoprene rubber, nitrile-butadiene rubber or ethylene-propylene terpolymer.

Furthermore, thiodipropionitrile has such an outstanding characteristic that it can be applied in combination with the conventionally available vulcanizing agents, vulcanization accelerators, inhibiting agents for heat-aging or flex-cracking, antioxidants, filler pigments and other rubber-compounding agents, without giving any adverse effect on the vulcanization property and other physical properties of rubber.

The amount of thiodipropionitrile to be used is generally 0.01 to 10 percent by weight based on rubber, and preferably 0.1 to 5 percent, and in addition the performance thereof can outstandingly be increased by the combination with petroleum waxes.

The present invention will be illustrated with reference to the following examples, which are only given for the purpose of illustration and not to be interpreted as limiting. Parts are by weight.

EXAMPLE 1

Two parts of each of the compounds in Table 1 (sample numbers A and B) and, as a counterpart, Antiozonant AFD (a registered trademark of Bayer Co. Ltd.) represented by sample number C were individually mixed thoroughly with the following rubber compound,

| | | |
|---|---|---|
| pale crape No. 1 | 100 | parts |
| stearic acid | 2 | " |
| zinc oxide | 5 | " |
| white carbon (Caplex No. 80, a registered trademark of Shionogi Seiyaku Co. Ltd.) | 30 | " |
| light calcium carbonate | 40 | " |
| titanium dioxide | 10 | " |
| softener (Circosol 42 XH, a registered trademark of Sun Oil Co. Ltd.) | 10 | " |
| activator (Acting SL, a registered trademark of Kawaguchi Kagaku Co. Ltd.) | 1 | " |
| sulfur | 0.5 | part |
| dibenzothiazyl disulfide | 0.8 | " |
| tetramethylthiuram monosulfide | 0.1 | " | and each resulting mixture was well milled on a 2-roll mill of 10 inches in diameter and then vulcanized thereon at 140°C. for 20 minutes. A blank test was also carried out at the same time for comparison, using the rubber compound alone above mentioned.

Then, Dumbbel No. 2 test pieces were prepared from each vulcanized batch thus obtained according to ASTM D-412-51T. The static and dynamic ozone deterioration tests were made on the test pieces on the Ozone Weather-O-Meter produced by Toyo Rika Co. Ltd. In the static test, the Dumbbel No. 2 test pieces were kept at a 20 percent elongation in the stream of ozone during the test, and during the latter test, the test pieces were given repeated elongation of from 0 up to 20 percent once a second in the stream of ozone.

The tests were carried out under the condition that the ozone concentration be 35 ± 5 pphm and the test temperature be 50° ± 10°C., and the time required for the generation of visually observable cracks on the surface of the vulcanized rubber was taken as a crack-generating time which was used as the measure of ozone-resistance. The results of the static and dynamic ozone deterioration tests are as shown in Table 2 and Table 3, respectively.

Table 1

| Sample No. | Sample |
|---|---|
| A | $N \equiv C - (CH_2)_2 - S - (CH_2)_2 - C \equiv N$ |
| B | a mixture of No. A and petroleum (Suntight S[(1)]) in a weight ratio of 1:1 |
| C | Antiozonant AFD |

Note: [(1)]A registered trademark of Seiko Kagaku Co. Ltd.

Table 2

| Sample No. | Static ozone deterioration test Amount added (part) | Crack-generating time (hour) |
|---|---|---|
| A | 2 | 20 |
| B | 2 | 25 |
| C | 2 | 10 |
| | no addition | 2 |

Table 3

| Sample No. | Dynamic ozone deterioration test Amount added (part) | Crack-generating time (hour) |
|---|---|---|
| A | 2 | 24 |
| B | 2 | 24 |
| C | 2 | 12 |
| | no addition | 2 |

EXAMPLE 2

Two parts of each of the compounds in Table 1 (sample numbers A and B) and, as a counterpart, Antiozonant AFD represented by sample number C were individually mixed thoroughly with the following rubber compound,

| SBR No. 1502 | 100 | parts |
|---|---|---|
| stearic acid | 1 | " |
| zinc oxide | 5 | " |
| white carbon (Carplex No. 80) | 30 | " |
| light calcium carbonate | 20 | " |
| titanium dioxide | 10 | " |
| softener (Circosol 42 XH) | 10 | " |
| activator (Acting SL) | 1 | " |
| sulfur | 2 | " |
| dibenzothiazyl disulfide | 1.5 | " |
| tetramethylthiuram monosulfide | 0.2 | part | and each resulting mixture was well milled on a 2-roll mill of 10 inches in diameter and then vulcanized thereon at 150°C. for 30 minutes. A blank test was also carried out at the same time for comparison, using the rubber compound alone above mentioned. The test pieces prepared from each vulcanized batch were tested under the same condition of ozone deterioration test as described in Example 1.

The results of the static and dynamic ozone deterioration tests are as shown in Table 4 and Table 5, respectively.

Table 4

| Sample No. | Static ozone deterioration test Amount added (part) | Crack-generating time (hour) |
|---|---|---|
| A | 2 | 16 |
| B | 2 | 22 |
| C | 2 | 6 |
| | no addition | 1 |

Table 5

| Sample No. | Dynamic ozone deterioration test Amount added (part) | Crack-generating time (hour) |
|---|---|---|
| A | 2 | 21 |
| B | 2 | 20 |
| C | 2 | 9 |
| | no addition | 2 |

EXAMPLE 3

Two parts of each of the present compounds in Table 1 (sample numbers A and B) and, as a counterpart, Antiozonant AFD represented by sample number C were individually mixed thoroughly with the following rubber compound,

| chloroprene rubber WR T | 100 | parts |
|---|---|---|
| stearic acid | 0.5 | part |
| zinc oxide | 5 | parts |
| magnesia | 4 | " |
| light calcium carbonate | 45 | " |
| titanium dioxide | 5 | " |
| 2-mercapto imidazoline | 0.5 | part | and each resulting mixture was well milled on a 2-roll mill of 10 inches in diameter, and then vulcanized thereon at 150°C. for 30 minutes. A blank test was also carried out at the same time for comparison, using the rubber compound alone above mentioned.

The test pieces prepared from each vulcanized batch were tested under the same condition of ozone-deterioration test as described in Example 1 except that the ozone concentration was 90 ± 5 pphm.

The results of the static and dynamic ozone deterioration tests are as shown in Table 6 and Table 7, respectively.

Table 6

| Sample No. | Static ozone deterioration test Amount added (part) | Crack-generating time (hour) |
|---|---|---|
| A | 1.5 | 200 |
| B | 1.5 | 220 |
| C | 1.5 | 140 |
| | no addition | 20 |

Table 2

| Sample No. | Dynamic ozone deterioration test | |
|---|---|---|
| | Amount added (part) | Crack-generating time (hour) |
| A | 1.5 | 220 |
| B | 1.5 | 230 |
| C | 1.5 | 160 |
| | no addition | 40 |

EXAMPLE 4

Vulcanized rubber was tested on its discoloring and staining properties by the following test method. A strip test piece was prepared from each white vulcanized batch obtained in Example 1. Each piece was placed on the paper coated with a nitrocellulose based white lacquer, and the whole was attached, with the test piece faced outward, to an exposure frame which faced toward south at 45° of inclination angle, and exposed to sun light for 15 days. The results of the exposure tests are as shown in Table 8.

Table 8

| Sample No. | Amount added (part) | Shades of test piece after test | Shades of lacquer coated surface after test |
|---|---|---|---|
| A | 2 | pale yellow | very pale yellow |
| B | 2 | very pale yellow | white |
| C | 2 | pale yellow | very pale yellow |
| | no addition | pale yellow | white |

It can clearly be understood from the test results that thiodipropionitrile is equivalent to superior to the well known antiozonant AFD which is said to have the most excellent non-discoloring and non-staining properties, and that it is also remarkably superior to Antiozonant AFD in the inhibiting effect of ozone deterioration.

What we claim is:
1. A method for inhibiting ozone deterioration of rubber which is selected from the group consisting of natural rubber, styrene-butadiene rubber with cis-1,4-structure content of 5–20 percent, chloroprene rubber, butadiene rubber with cis-1,4-structure content of 5–20 percent, isobutylene-isoprene rubber, isoprene rubber, nitrile butadiene rubber and ethylene-propylene terpolymer, which comprises adding to the rubber, 0.01 to 10 percent based on the weight of the rubber, of thiodipropionitrile.

\* \* \* \* \*